(12) United States Patent
Shimazaki

(10) Patent No.: US 6,473,197 B1
(45) Date of Patent: *Oct. 29, 2002

(54) COLOR CORRECTION APPARATUS

(75) Inventor: Osamu Shimazaki, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/895,572

(22) Filed: Jul. 16, 1997

(30) Foreign Application Priority Data

Jul. 17, 1996 (JP) .............................................. 8-187936

(51) Int. Cl.[7] .............................. G06F 15/00; G03F 3/08
(52) U.S. Cl. ........................ 358/1.9; 358/1.13; 358/523
(58) Field of Search ................................ 358/518, 523, 358/524, 525, 527, 515, 519, 520, 521, 504, 501, 1.1, 1.9, 1.12, 1.13, 1.15, 1.16, 1.18, 3.21, 3.23, 3.27; 379/100.01; 382/162, 167

(56) References Cited

U.S. PATENT DOCUMENTS

| | | | | |
|---|---|---|---|---|
| 4,809,198 A | * | 2/1989 | Terashita ..................... 364/525 |
| 4,827,109 A | * | 5/1989 | Matsumoto et al. ......... 235/375 |
| 4,942,424 A | * | 7/1990 | Terashita et al. ............... 355/38 |
| 5,073,818 A | * | 12/1991 | Iida ............................. 358/523 |
| 5,305,020 A | * | 4/1994 | Gibbons et al. ............... 346/76 |
| 5,317,425 A | * | 5/1994 | Spence et al. ............... 358/523 |
| 5,436,734 A | * | 7/1995 | Yamauchi et al. ........... 358/448 |
| 5,436,739 A | | 7/1995 | Imao et al. ................... 358/518 |
| 5,563,720 A | * | 10/1996 | Edgar et al. ................. 358/447 |
| 5,583,666 A | * | 12/1996 | Ellson et al. ................. 358/518 |
| 5,717,839 A | * | 2/1998 | Ichikawa ..................... 358/523 |
| 5,828,470 A | * | 10/1998 | Maeda et al. ................ 358/504 |
| 5,835,244 A | * | 11/1998 | Bestmann .................... 358/523 |

FOREIGN PATENT DOCUMENTS

| | | | | |
|---|---|---|---|---|
| JP | 6-296231 | 10/1994 | ............ H04N/1/40 |
| JP | 06296231 A | 10/1994 | |
| JP | 6-334853 | 12/1994 | ............ H04N/1/40 |
| JP | 06334853 A | 12/1994 | |

OTHER PUBLICATIONS

Communication from European Patent Office dated Jul. 18, 2000.

* cited by examiner

Primary Examiner—Madeleine Nguyen
(74) Attorney, Agent, or Firm—Sughrue Mion, PLLC

(57) ABSTRACT

A color correction apparatus for effecting a plurality of kinds of color correction, including color correction as standard color transformation and color correction for correcting a difference in color output density due to at least one of a printer condition and a printing condition, is comprised of: an input device for inputting color image data; a color-correction calculating device for effecting the plurality of kinds of color correction of the color image data inputted to said input device, in one stage of synthesized color correction; and an output device for outputting the color image data subjected to color correction by said color-correction calculating device. Since a plurality of kinds of color correction are effected in the one stage, it is possible to effect color correction with a simple configuration and at a high speed.

6 Claims, 14 Drawing Sheets

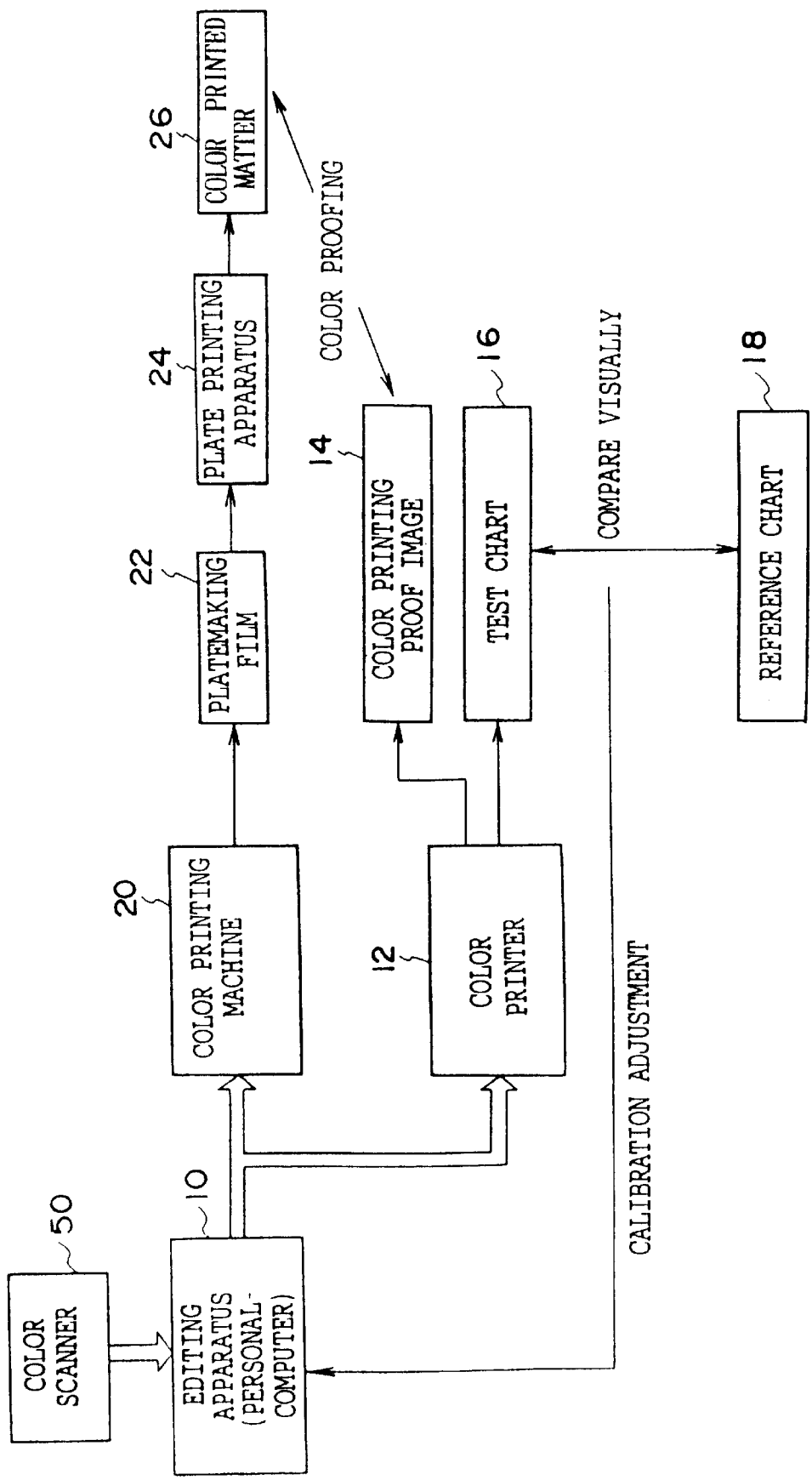

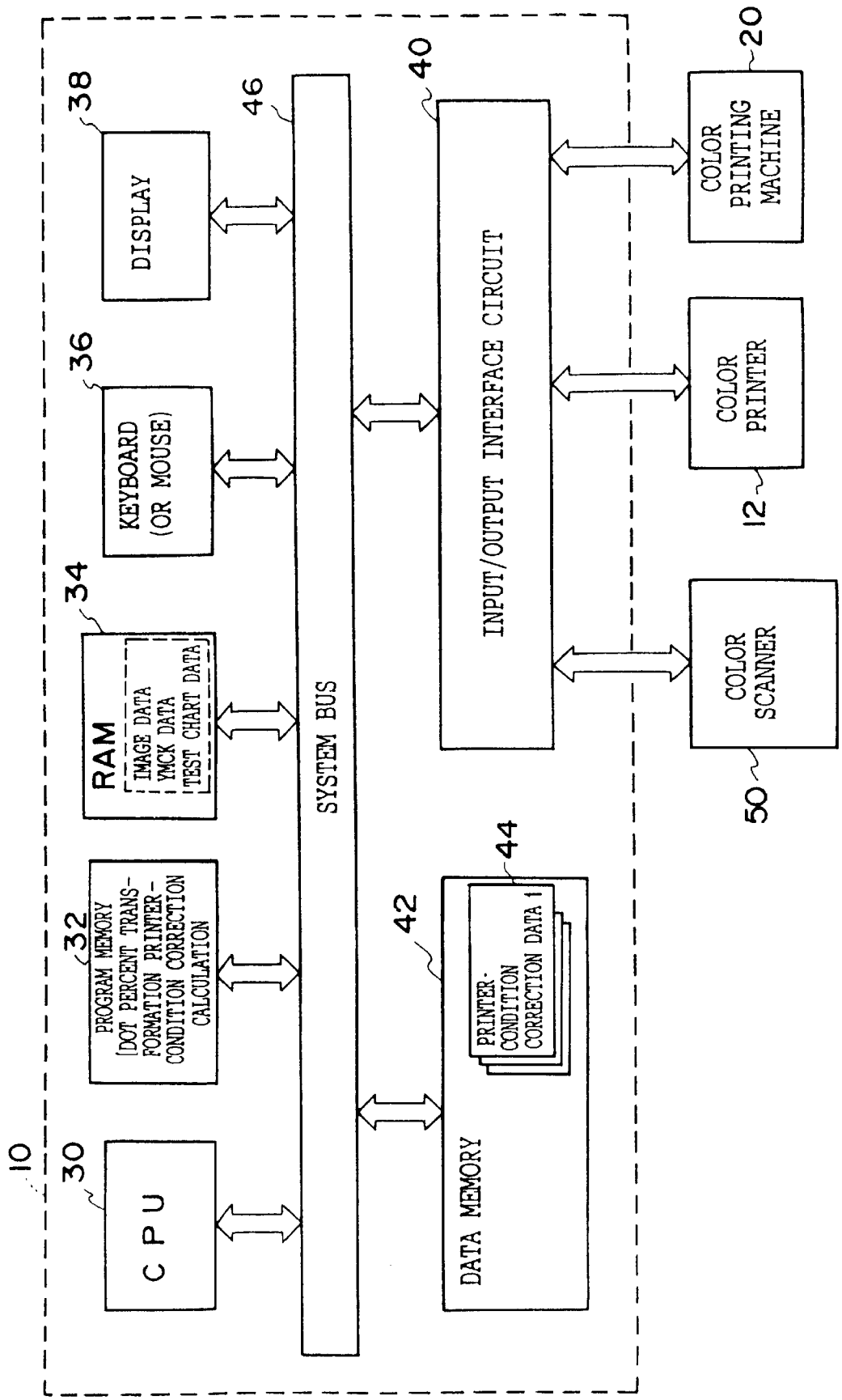

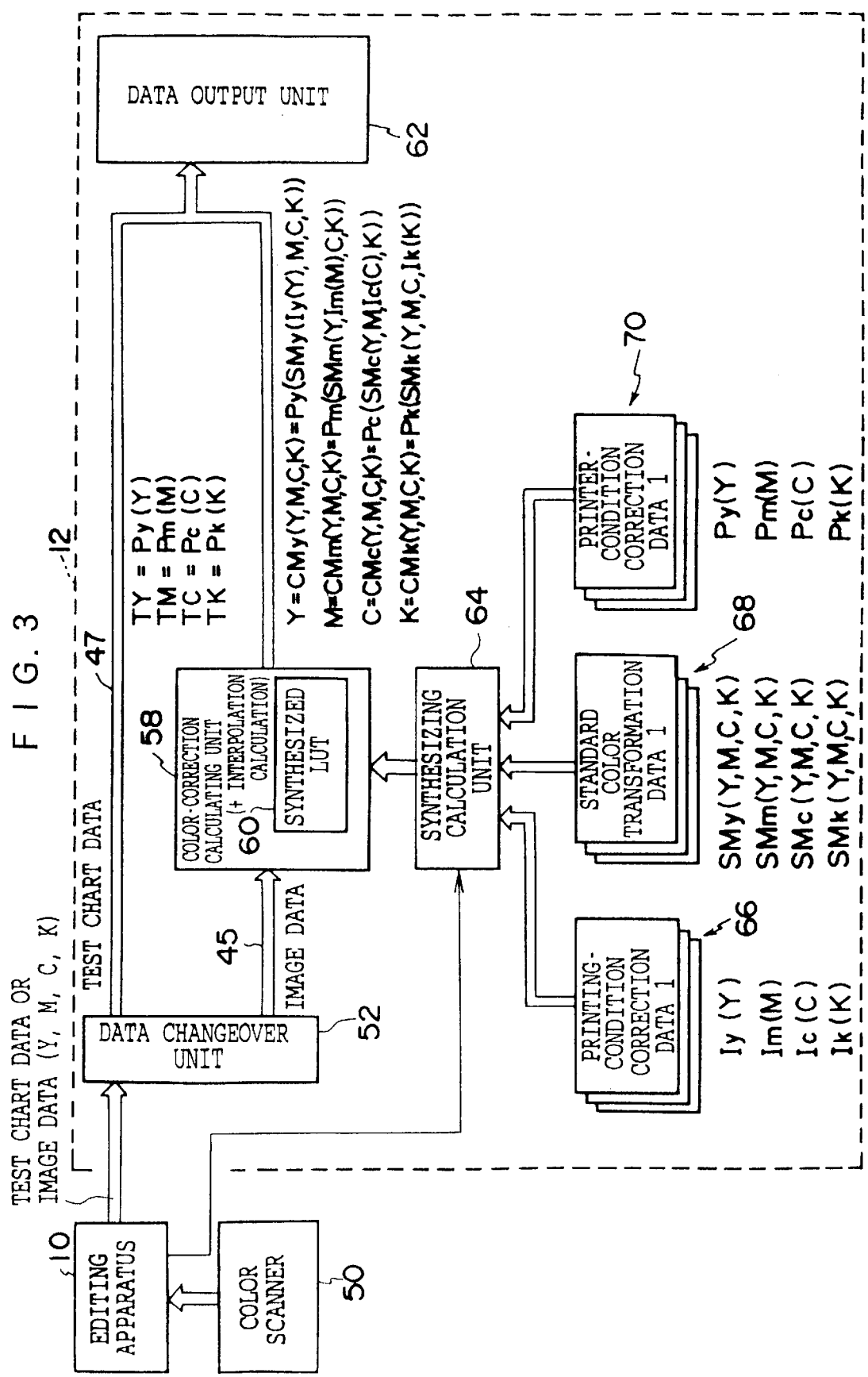

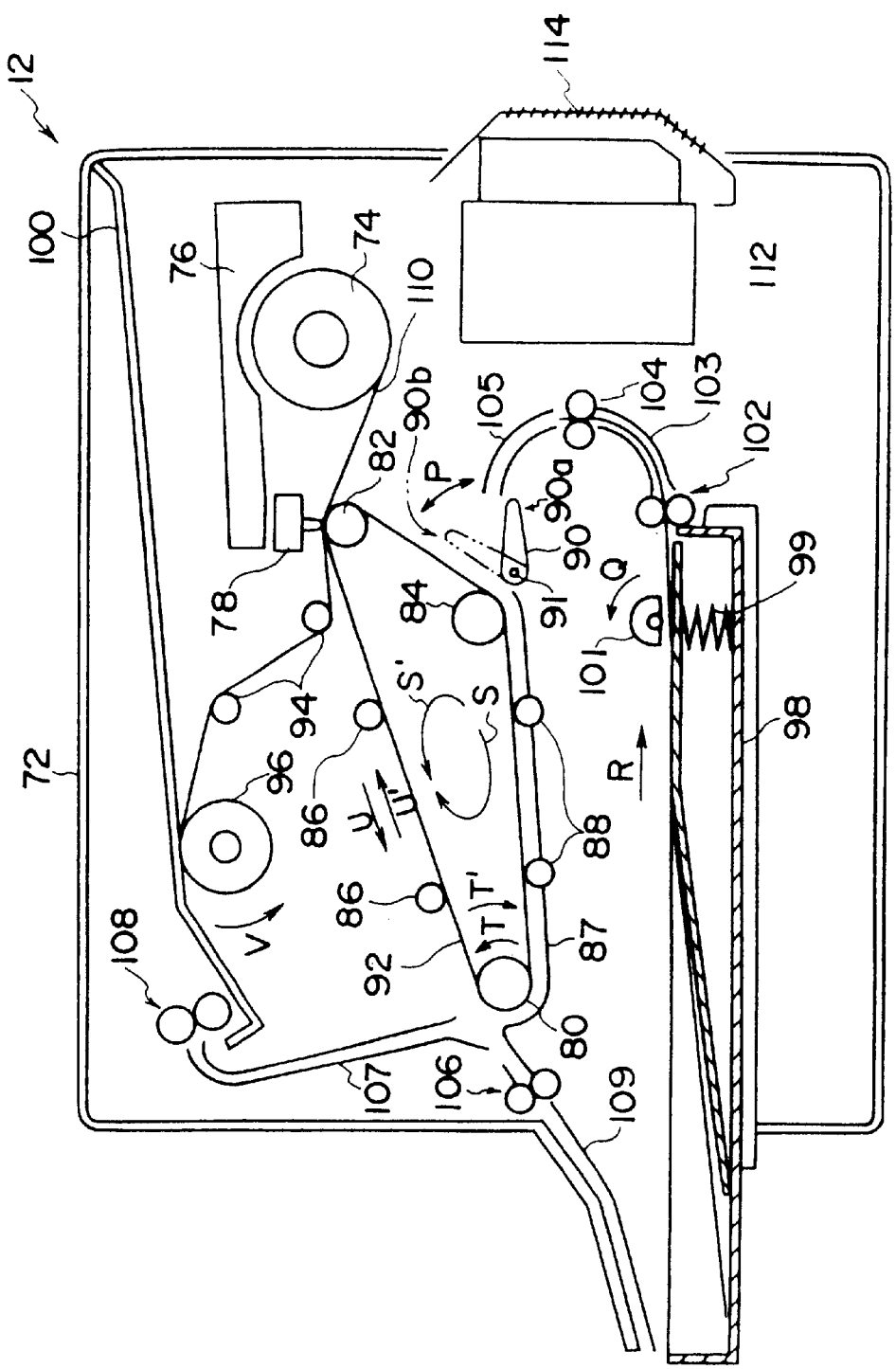

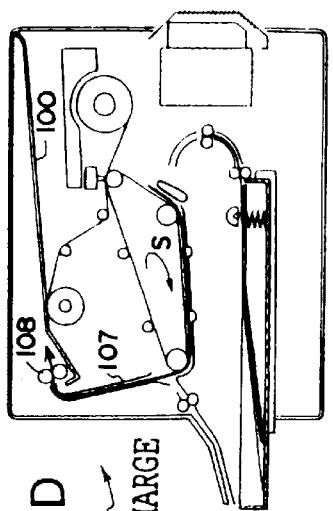
FIG. 6D
START OF DISCHARGE OF PAPER
FIG. 6E
DISCHARGING IS COMPLETED CHANGE OVER THE GUIDE LEVER
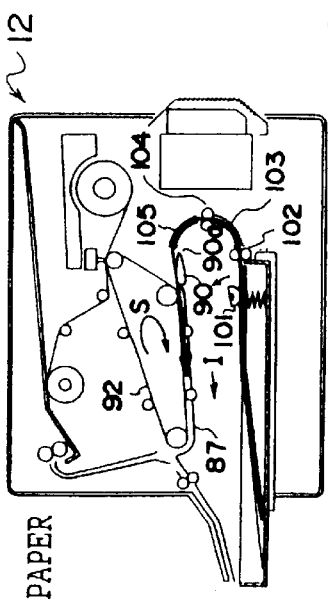
FIG. 6A
DRAWING OUT OF PAPER FROM TRAY
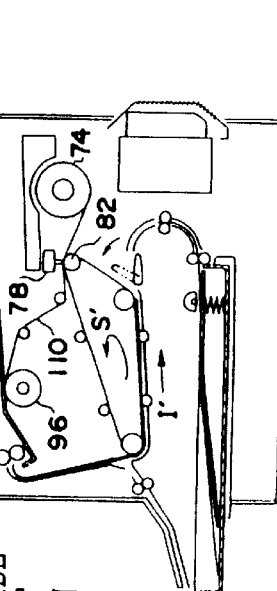
FIG. 6B
CHANGE OVER OF GUIDE LEVER AND START OF HEAT SENSITIZATION
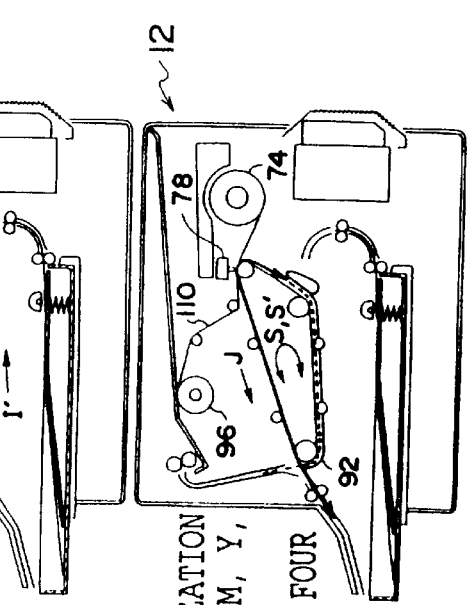
FIG. 6C
REPEAT HEAT SENSITIZATION ONCE FOR EACH OF C, M, Y, AND K REGIONS OF INK SHEET, OR A TOTAL OF FOUR TIMES (SWITCHBACK SYSTEM)

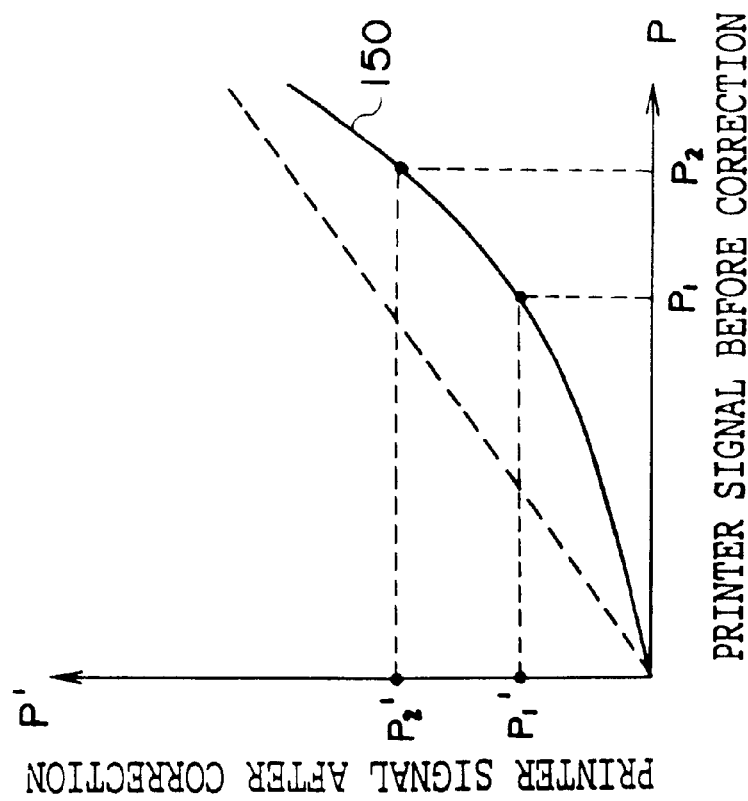
F I G. 12B
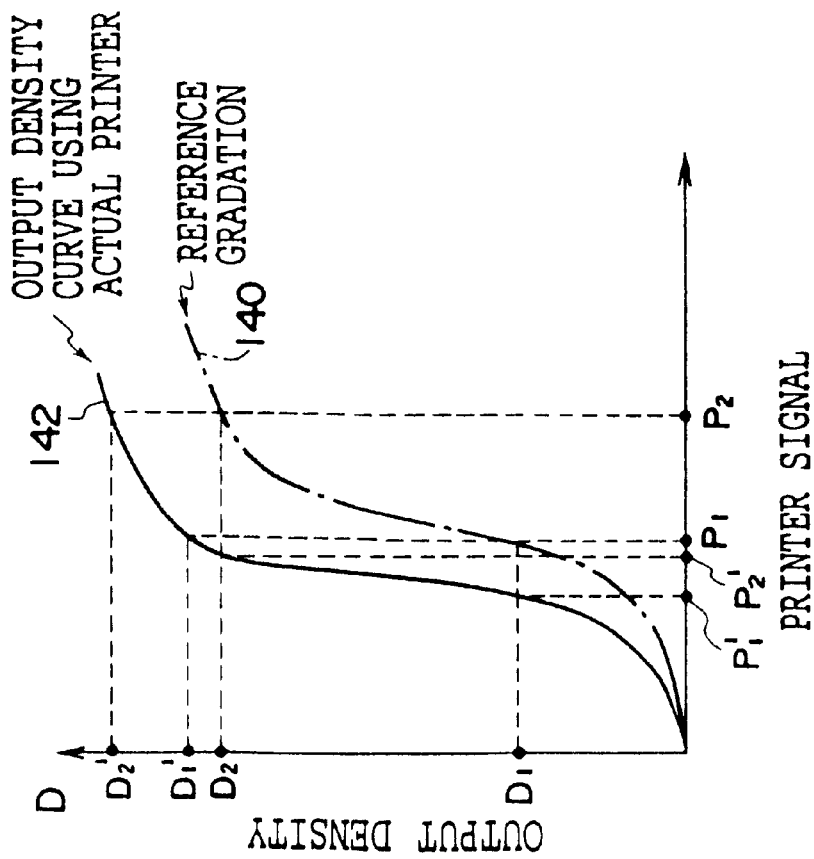
F I G. 12A

FIG. 13

TEST CHART FOR CALIBRATION (OR REFERENCE CHART)

|  | K | C | M | Y |
|---|---|---|---|---|
| 100% | ☐ | ☐ | ☐ | ☐ |
| 95% | ☐ | . | . | . |
| 90% | ☐ | . | . | . |
| . | . | . | . | . |
| . | . | . | . | . |
| . | . | . | . | . |
| . | . | . | . | . |
| 5% | ☐ | . | . | . |
| 0% | ☐ | ☐ | ☐ | ☐ |

DOT %

21 × 4 = 84 PIECES OF DATA

COLOR CORRECTION APPARATUS

BACKGROUND OF THE INVENTION

1 Field of the Invention

The present invention relates to a color correction apparatus for effecting the color correction of an input/output apparatus connected to a system for inputting and outputting a color image, such as a color printing machine, a color printer, a color copying machine, a color facsimile machine, and a color display.

2 Description of the Related Art

Conventionally, the following apparatuses are known as color correction apparatuses for effecting color correction into input/output color representation values which are peculiar to an input/output apparatus connected to a color-image input/output system, such as a color printing machine, a color printer, a color copying machine, a color facsimile machine, and a color display.

Japanese Patent Application Laid-Open (JP-A) No. 6-296231 discloses a technique wherein, in an apparatus for transforming color representations, which are independent of characteristics of an input/output apparatus, such as L*a*b* values and L*u*v* values, into color representations for the input/output apparatus, such as CMY values and CMYK values by an interpolated lookup table method, the so-called affine transformation is performed with respect to the color representations which are independent of the characteristics of the input/output apparatus in an early stage of the retrieval of the lookup table.

In addition, Japanese Patent Application Laid-Open (JP-A) No. 6-334853 discloses a technique wherein the type of an input/output apparatus connected to an input/output system is determined, a color correction table corresponding to the type of apparatus is set in a memory, and color correction is executed with respect to inputted color image data on the basis of the color correction table. According to this technique, it is possible to correct with high accuracy those variations in the input signal and variations in the printed-output density that are ascribable to the type of apparatus.

In addition, with a color printing machine which makes use of a conventional rotary press or the like, color printed matter based on the so-called halftone images is prepared. Before preparing the color printed matter, a color printing proof image (also called a color printing proof is prepared in advance by using a color printer having a simple configuration, so as to proof the color printing on the basis of the image. By the use of this color printer, it becomes unnecessary to prepare a platemaking film, a printing-plate (PS plate), or the like concerning the color printing machine at the time of proofing, thereby making it possible to substantially improve the efficiency in the proofing operation.

Before preparing the color printing proof image for proofing, it is necessary to correct in advance the difference in density between the color printed matter and the printed output, which is attributable to printer conditions, such as the machine difference, changes over time, and the like, of the color printer (this correction is referred to as the calibration adjustment).

For example, as shown in FIG. 12A, even in the case of a printer in which the relationship between the output density and the printer signal inputted to an output unit is expressed by an output density curve 140 having reference gradations indicated by the chain line, its characteristic curve changes to an output density curve that is different from the output density curve 140, e.g., to an output density curve 142 indicated by the solid line, due to the difference of the individual apparatuses or because of the lapse of time. In this case, even if a printer signal P1 or P2 is inputted to the output unit of the relevant printer in an attempt to obtain an output density D1 or D2, the actually outputted density becomes D1' or D2', with the result that, if this state is left as it is, it is impossible to output an appropriate color printing proof image.

Accordingly, a printer signal P is converted into a signal P' on the basis of a conversion curve 150 shown in FIG. 12B, for instance, and the signal after correction is inputted to the output unit of the printer, thereby obtaining an output density at the reference gradation. With this conversion curve 150, the printer signals P1 and P2 before correction become signals P1' and P2' after correction. Hence, even with the output unit having the characteristic of the output density curve 142, if the printer signals P1' and P2' are inputted thereto, it is possible to obtain appropriate output densities D1 and D2, as shown in FIG. 12A.

In this calibration adjustment, a method is adopted in which, after the dot percent data of four plates for the respective colors, cyan (C), magenta (M), yellow (Y), and black (K), are converted by a four-dimensional (4D) conversion table for color correction incorporated in the color printer as image data, data converted by a one-dimensional (1D) conversion table for calibration are then printed out, and a comparison is made between the printed-out densities and the densities of the respective colors of a calibration chart (color patches) serving as a reference, so as to adjust the 1D conversion table for calibration. Namely, the image data are converted by tables in at least two stages.

Actually, in a color printer for color proofing, color correction is carried out by using tables in three stages by further adding a printing-condition correction 1D conversion table for correcting the printing conditions of the above two tables, as shown in FIG. 11, by taking into consideration the difference in printing conditions (e.g., the type of printing paper and the type of printing ink) concerning the color printing machine.

However, with the technique disclosed in Japanese Patent Application Laid-Open (JP-A) No. 6-296231, when color transformation is effected in two stages by the transformation using a lookup table and the affine transformation, there arises the problem that the processing speed of color transformation declines, and the apparatus becomes complex due to the, preparation of tables in two stages.

In addition, with the technique disclosed in Japanese Patent Application Laid-Open (JP-A) No. 6-334853, although improvement can be made on variations such as the output density due to the machine type of the input/output apparatus, in a case where color correction is effected by using a color correction table in one stage by concurrently taking into consideration other conditions such as printing conditions, it is necessary to prepare color correction tables, for each combination of various different kinds of conditions. Hence, there arises the problem that a memory of a very large capacity is required.

Furthermore, with the aforementioned conventional color printer as the apparatus for preparing a color printing proof image, since color correction is effected in three stages by using the 4D conversion table for color correction, the 1D conversion table for calibration, and the printing-condition correcting table, there arises the problem that the processing speed of color correction declines, and the apparatus becomes complex due to the preparation of tables in three stages.

SUMMARY OF THE INVENTION

In view of the above-described circumstances, it is an object of the present invention to provide a color correction apparatus with a simple configuration capable of effecting color correction calculation at high speed and with high accuracy.

To attain the above object, in accordance with a first aspect of the present invention, there is provided a color correction apparatus for effecting a plurality of kinds of color correction, including color correction as standard color transformation and color correction for correcting a difference in color output density due to at least one of a printer condition and a printing condition, comprising: input means for inputting color image data; color-correction calculating means for effecting the plurality of kinds of color correction of the color image data inputted to said input means, in one stage of synthesized color correction; and output means for outputting the color image data subjected to color correction by said color-correction calculating means.

In accordance with the above-described first aspect of the invention, the plurality of kinds of color correction, including color correction as standard color transformation and color correction for correcting a difference in color output density due to at least one of a printer condition and a printing condition are effected by the color-correction calculating means in one stage of synthesized color correction with respect to the color image data inputted to said input means. Then, the output means outputs the color image data subjected to color correction by the color-correction calculating means. Here, the printer condition refers to a condition on the output apparatus side, such as a machine difference of the output apparatus, a change in the environment in which the apparatus is placed, or a change over time. The printing condition refers to a condition on the color printing machine side, such as the type of printing paper and a printing environment for outputting a color print image. In addition, the standard color transformation refers to standard color correction which is effected in correspondence with an output system, and the like, of a color printer or a color printing machine, and is independent of the above-described individual conditions.

Thus, since a plurality of kinds of color correction are effected in one stage of synthesized color correction, it is possible to effect color correction with a simple configuration and at high speed as compared with a case where the plurality of kinds of color correction are effected in two or more stages. Moreover, since the difference in color ascribable to at least one of the: printer conditions and the printing conditions can be corrected, it is possible to obtain a color image with high accuracy. It should be noted that the color-correction calculating means may comprise, for example, a neural network which has undergone learning so as to effect the aforementioned plurality of kinds of color correction.

A second aspect of the present invention, comprise the above-described first aspect of the invention, wherein the color-correction calculating means effects the synthesized color correction on the basis of a single lookup table.

In accordance with the above-described second aspect of the invention, since synthesized color correction is effected on the basis of a single lookup table, it is possible to effect color correction with a simpler apparatus and at higher speed and with higher accuracy. Incidentally, interpolation calculation may be performed at the time of the synthesized color correction.

In accordance with a third aspect of the present invention, the color correction apparatus in accordance with the first or second aspect of the invention further comprises: storage means for storing for each kind of that color correction, a plurality of pieces of data for color correction that serves as a basis of the color correction; designating means for designating one piece of the data for color correction at a time for each kind of the color correction; and synthesizing means for preparing synthesized color-correction data that serves as a basis of synthesized color correction by combining the data for color correction designated by said designating means.

In accordance with the above-described third aspect of the invention, the storage means stores for each kind of color correction a plurality of pieces of data for color correction that serves as a basis of the color correction. The designating means designates one piece of the stored data for color correction at a time, for each kind of the color correction. Then, the synthesizing means prepares synthesized color-correction data that serves as a basis of synthesized color correction by combining the data for color correction designated by said designating means. The color-correction calculating means effects synthesized color correction on the basis of the synthesized color-correction data that has been synthesized. Thus, in accordance with this aspect of the invention, since synthesized color-correction data can be synthesized by designating data for color correction for each condition, it is possible to save memory and simplify the apparatus even in a case where color correction is effected with high accuracy by color correction that takes a large number of conditions into consideration.

The above and other objects, features and advantages of the present invention will become more apparent from the following detailed description of the invention when read in conjunction with the accompanying drawings.

BRIEF DESCRIPTION OF THE DRAWINGS

FIG. 1 is a diagram illustrating an example of the configuration of a system for preparing a color printing proof image and color printed matter;

FIG. 2 is a circuit diagram of an editing apparatus functioning as a host apparatus of a color printer in accordance with an embodiment of the present invention;

FIG. 3 is a block diagram of a color printer in accordance with a first embodiment;

FIG. 4 is a schematic diagram of a thermal printer as one example of a color printer in accordance with an embodiment of the present invention;

FIGS. 5A and 5B are partial diagrams of the thermal printer in accordance with an embodiment of the present invention, in which FIG. 5A is a perspective view illustrating an ink sheet supplying/collecting system and a thermosensitive paper transporting system in the thermal printer;

FIGS. 6A to 6E are diagrams illustrating transport passages for thermosensitive paper in the thermal printer in accordance with an embodiment of the present invention, in which FIG. 6A is a diagram at the time of drawing out of the paper from a paper tray, FIG. 6B is a diagram at the time of start of heat sensitization, FIG. 6C is a diagram at the time of execution of a switchback system, FIG. 6D is a diagram at the time of the discharging of the paper, and FIG. 6E is a diagram illustrating a transport passage at the time of completion of discharge;

FIGS. 12A and 12B are diagrams explaining the need for correction of printer-condition correction data, in which FIG. 12A is a graph illustrating the relationship between a printer signal and an output density, and FIG. 12B is a graph illustrating the relationship between the printer signal before correction and the printer signal after correction;

FIG. 13 is a diagram illustrating a format of a test chart or a reference chart which is printed during calibration adjustment.

DESCRIPTION OF THE PREFERRED EMBODIMENTS

First Embodiment

Figure 5A:
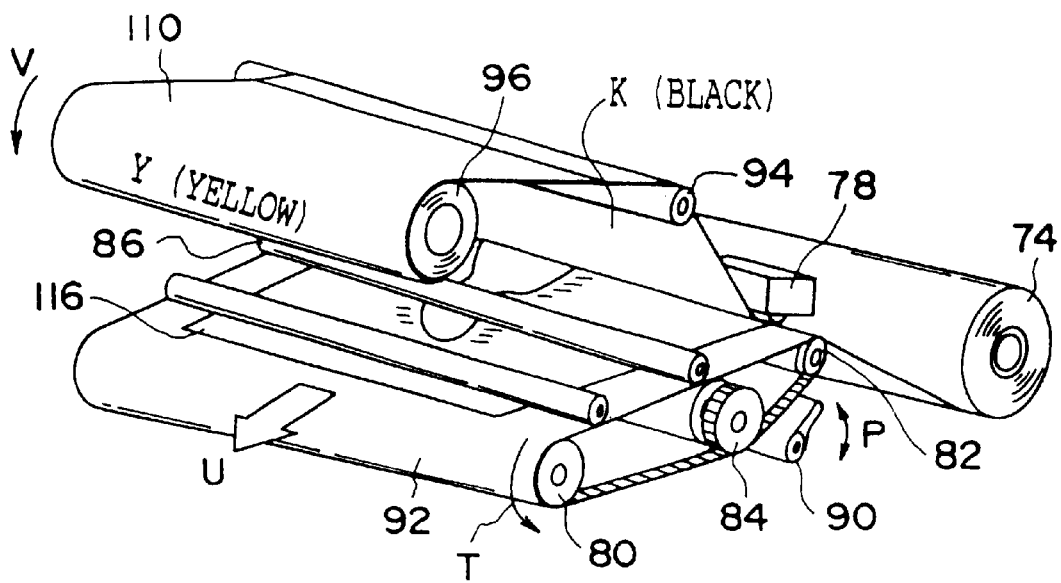

Referring now to the accompanying drawings, a description will be given of a first embodiment in which a color correction apparatus in accordance with the present invention is applied to a color printer for preparing a color printing proof image.

FIG. 1 shows an example of a system configuration for preparing a color printing proof image and color printed matter. As shown in FIG. 1, the system for preparing a color printing proof image is provided with a color printer 12 for outputting a color printing proof image 14 for proofing as well as an editing apparatus 10 functioning as a host apparatus for the color printer 12. As the color printer 12, it is possible to use a small computer having a simple configuration, such as a so-called thermal printer, as will be described later.

The editing apparatus 10 can comprise, for example, a personal computer, and controls calibration adjustment of the color printer 12 by transmitting test chart data, which will be described later, to the color printer 12 connected to the editing apparatus 10. Namely, during the calibration adjustment, the color printer 12 outputs a test chart 16 for correcting the difference between the color printing proof image 14 and color printed matter 26, which occurs due to conditions of the printer, such as a machine difference and the like of the color printer. An operator visually compares the test chart 16 and reference data 18 printed in standard gradations, and if correction is necessary, the operator adjusts the conditions of the printer through the editing apparatus 10.

Further, a color printing machine 20 for outputting a plate making film 22 based on layout data for which printing conditions and color correction transformation have been effected by the editing apparatus can also be connected to the editing apparatus 10. When this plate making film 22 is used for printing by a printing-plate (PS plate) printing apparatus 24, the color printed matter 26 to be finally obtained is prepared.

Referring next to FIG. 2, a description will be given of an example of a detailed circuit configuration of the editing apparatus 10.

As shown in FIG. 2, the editing apparatus 10 is comprised of a CPU 30 for controlling and managing the overall apparatus on the basis of a predetermined program; a program memory 32 for storing the predetermined program; a RAM 34 which is used as a work area of the CPU 30 and an area for storing input image data and bit map data; a data memory 42 constituted by a nonvolatile memory for storing data; a keyboard (or a mouse) 36 serving as an input means for input by the operator; a display 38 for displaying the result of processing and the like; and an input/output interface circuit 40 for controlling an input/output interface to output input/output apparatuses. The respective units and apparatuses are connected to a system bus 46 for transmitting data and commands.

Printer-condition correction data 44 for correcting the printer conditions, such as the machine difference, changes over time, and the like, of the color printer 12, are stored in the data memory 42. It should be noted that a plurality of pieces of data 1, 2, . . . , N are prepared as the printer-condition correction data 44, and the individual pieces of data are set to be the same data as the printer-condition correction data 1, 2, . . . which are stored in the color printer 12, as will be described later.

A color scanner 50 serving as an external input apparatus, the color printer 12 serving as an external output apparatus, and the color printing machine 20 are connected to the input/output interface circuit 40.

Figure 14:
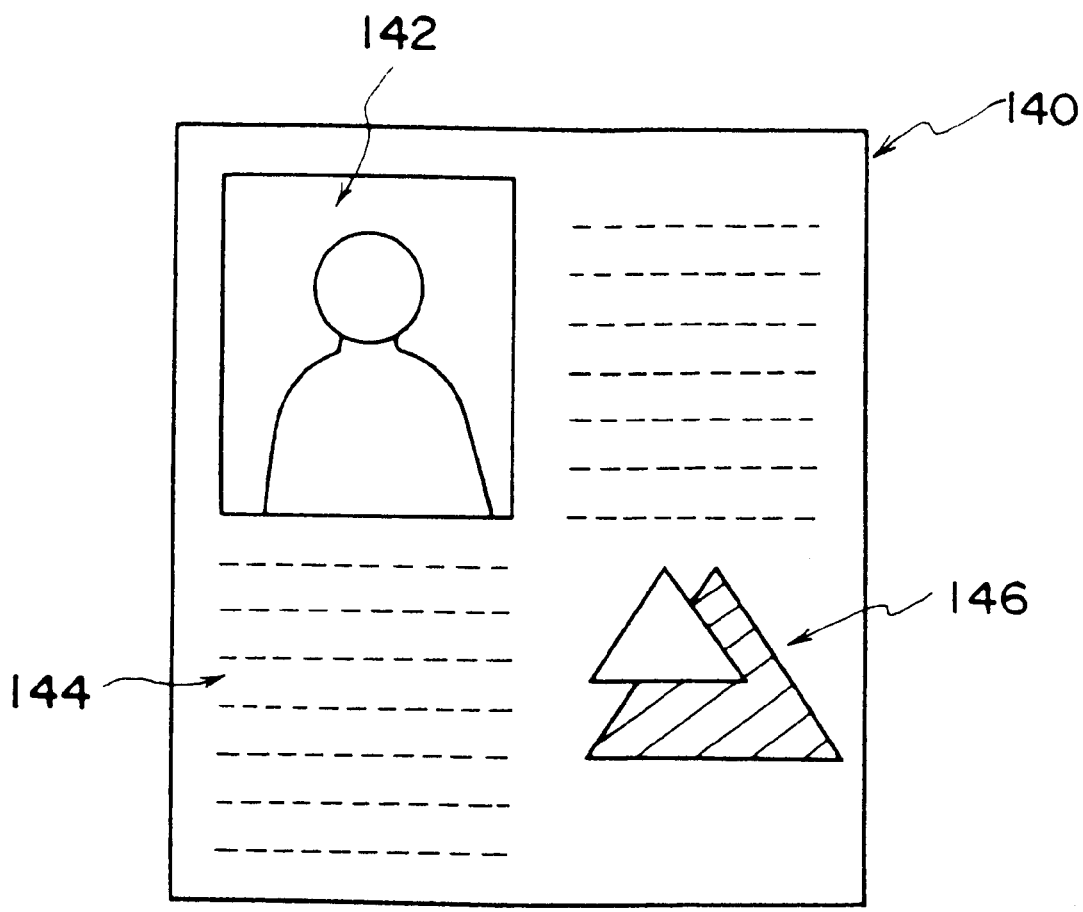
FIG. 14 is a diagram illustrating an image original which is read by a color scanner.

The color scanner 50 scans an image original 140, such as the one shown in FIG. 14, with light, transforms reflected light from the original into image data for each color of R (red), G (green), and B (blue), and inputs the data to the editing apparatus 10 via the input/output interface circuit 40. The inputted image data are interpreted by an unillustrated interpreter, and are stored in the RAM 34 as layout data in which character data 144, line drawing data 146, and gradation image data 142 are laid out in the form of print, as shown in FIG. 14. It should be noted that the image data may be read from a recording medium such as a magneto-optical disk and a CD-ROM.

It should be noted that, among others, a subroutine for transforming the image data R, G, and B which has been read by the color scanner 50 into dot percent data Y, M, C, and K, as well as a subroutine for transforming the test chart data by means of the printer-condition correction data 44, are stored in the program memory 32 in addition to a main program for control. The editing apparatus 10 transforms the image data (R, G, and B) transmitted thereto from the color scanner 50 into the dot percent data Y, M, C, and K, and outputs the same to the color printer 12.

Next, a functional block diagram of the color printer 12 is shown in FIG. 3. As shown in FIG. 3, the color printer 12 is provided with a data changeover unit 52 for changing the output path for outputting the dot percent data Y, M, C, and K transmitted thereto from the editing apparatus 10. This data changeover unit 52 discriminates the type of inputted data on the basis of a header portion of the data or an instruction from the operator, outputs the image data of the image original to a first output path 45, and outputs the test chart data to a second output path 47. Here, the first output path 45 is an output path leading to a data output unit 62, for printing out the image data via a color-correction calculating unit 58 that will be described later. The second output path 47 is an output path which leads directly to the data output unit 62.

The color-correction calculating unit 58 provided on the first output path 45 effects the color correction of the dot percent data Y, M, C, and K on the basis of a synthesized lookup table (LUT) 60, and outputs the color-corrected data to the data output unit 62. This synthesized LUT 60 is a four-dimensional table for transforming the Y, M, C, and K data prepared in advance in a readable/writable nonvolatile memory of the color printer 12, and is arranged as a one-stage table for improving the improvement of processing speed in color correction transformation.

It should be noted that, as for the synthesized LUT 60, if data were prepared for all the gradations (e.g., 256 gradations) of the input data, the capacity would become extremely large, so the table can be thinned out so as to correspond to a smaller number of gradations (e.g., 33 gradations). In this case, the color-correction calculating unit 58 an interpolation calculation for the intermediate data which are not prepared in the synthesized LUT 60. Further, transformations including the affine transformation may be performed in the one-stage synthesized LUT 60.

In addition, printing-condition correction data 66 for correcting the Y, M, C, and K data in correspondence with the printing conditions during color printing, standard color transformation data 68 for effecting standard color correction which are independent of individual conditions in correspondence with an output system of the color printer or the color printing machine, and printer-condition correction data 70 for correcting the printer conditions, such as the machine difference, an environmental change, a change over time, and the like of the color printer, are respectively prepared in an unillustrated memory in the form of a plurality of tables of data 1, 2, 3, . . . , N for each condition. A synthesizing calculation unit 64 is capable of accessing this memory.

It should be noted that the aforementioned printing-condition correction data are data for correcting color differences due to, for example, a difference in the type of printing paper (coated paper, matte coated paper, noncoated paper, etc.) of the color printed matter to be finally obtained and due to a difference in the type of ink used for printing. In addition, a transformation for effecting color correction for color-proofing a color printing proof image may be added to the standard color transformation data 68.

The synthesizing calculation unit 64 selects one item of data from each of the types of data, including the printing-condition correction data 66, the standard color transformation data 68, and the printer-condition correction data 70, and synthesizes the three selected items of data in the order of data 66, 68, and 70, thereby preparing the synthesized LUT 60. Incidentally, the correction data to be synthesized may be designated by using an unillustrated input means such as a touch panel.

Here, in a case where Y, M, C, and K have been inputted, the transformations using the data 66, 68, and 70 are set, for example, as shown below. It should be noted that outputs based on the transformations are Y', M', C', and K'.

In the printing-condition correction data 66, the following transformations are performed:

$y'=Iy\ (Y)$ $M'=Im\ (M)$ $C'=Ic\ (C)$ $K'=Ik\ (K)$

That is, the transformed dot percent data for each color becomes a function of only the dot percent data of the corresponding color.

In the standard color transformation data 68, the following transformations are performed:

$Y'=SMy\ (Y, M, C, K)$ $M'=SMm\ (Y, M, C, K)$ $C'=SMc\ (Y, M, C, K)$ $K'=SMk\ (Y, M, C, K)$

That is, the transformed dot percent data for each color becomes a function of the dot percent data of all the colors.

In the printer-condition correction data 70, the following transformations are performed:

$Y'=Py\ (Y)$ $M'=Pm\ (M)$ $C'=Pc\ (C)$ $K'=Pk\ (K)$

That is, the transformed dot percent data for each color becomes a function of only the dot percent data of the corresponding color. This functional relation corresponds to a transformation curve 150 shown in FIG. 12B.

If the above transformations are synthesized by the synthesizing calculation unit 64, transformations on the basis of the synthesized LUT 60 are as follows:

$Y'=CMy\ (Y, M, C, K)=Py\ (SMy\ (Iy\ (Y), M, C, K))$ $M'=CMm\ (Y, M, C, K)=Pm\ (SMm\ (Y, Im\ (M), C, K))$ $C'=CMc\ (Y, M, C, K)=Pc\ (SMc\ (Y, M, Ic\ (C), K))$ $K'=CMk\ (Y, M, C, K)=Pk\ (SMk\ (Y, M, C, Ik\ (K))$

It should be noted that although, in the color printer 12 shown in FIG. 3, only the color correction of gradation image data and print output are illustrated, the character data and the line drawing data are also interpreted by the unillustrated interpreter from the original image data, and are outputted by the data output unit 62.

Next, the configuration of a thermal printer as an example of the color printer 12 is illustrated in FIG. 4. Incidentally, this thermal printer adopts a two-component color development system using two sheets, an intermediate sheet and an image-receiving sheet.

As shown in FIG. 4, the color printer 12 is covered with a housing 72, and a paper tray, in which sheets of thermosensitive paper for printing are set, is disposed at a bottom of the housing 72. The bottom of the paper tray 98 is gradually inclined in such a manner as to become higher in a drawing-out direction R, and is set to a fixed height in the vicinity of a paper drawing-out port. A spring 99 for pressing the thermosensitive paper upwardly is provided below the raised portion of the bottom.

A drawing-out roller 101 of a semicircular shape for drawing out the set thermosensitive paper is disposed immediately above the raised bottom portion of the paper tray 98 in the vicinity of the paper drawing-out port. This drawing-out roller 101 is ordinarily arranged with its flat bottom set substantially parallel with the paper surface as illustrated in the drawing, and when drawing out the thermosensitive paper, the drawing-out roller 101 rotates in the direction of arrow Q. As a result of this rotation, the sheets of the thermosensitive paper are consecutively moved in the drawing-out direction R in conjunction with the rotation of the drawing-out roller 101 as the thermosensitive paper is nipped by an arcuate portion of the roller 101 and the bottom of the paper tray 98 being pressed by the spring 99.

A pair of transport rollers for transporting the thermosensitive paper which has been drawn out is disposed at the drawing-out port of the paper tray 98, and an arcuate paper passage 103 for introducing the thermosensitive paper rightwardly diagonally upward, as viewed in FIG. 4, is provided on the transporting outlet side of the rollers 102. A pair of transport rollers 104 for further transporting the paper are disposed at a terminating end portion of the paper passage 103, and an arcuate paper passage 105 for introducing the thermosensitive: paper leftwardly diagonally upward, as viewed in FIG. 4, is provided on the transporting outlet side of the rollers 104. A terminating portion of this paper passage 105 is disposed as to be located substantially above the transport rollers 102. Thus, the thermosensitive paper which has been drawn out from the paper tray 98 is fed out from the terminating portion of the paper passage 105 in a direction opposite to the drawing-out direction R after traveling in a semicircle.

A guide lever 90 for changing the direction of transport of the thermosensitive paper is disposed in the vicinity of the terminating portion of the paper passage 105. This guide lever 90 is adapted to be rotatable about a support shaft 91 in the direction of arrow P by means of an unillustrated driving means, and is ordinarily set at a position 90a when the thermosensitive paper exits from the terminating portion of the paper passage 105. At the start of heat sensitizing operation, the guide lever 90 is rotated, and is changed over from the position 90a to a position 90b.

A bottom plate 87, which is gradually inclined to the same height as that of the support shaft 91, is disposed on the left-hand side, as viewed in FIG. 4, of the guide lever 90. The thermosensitive paper which has exited from the paper passage 105 is introduced onto the bottom plate 87 by means of the guide lever 90 set at the position 90a.

A transport belt, which is wound around a belt-driving pulley 80, a platen roller 82, and a roller 84, is disposed above the bottom plate 87. Torque is imparted to the belt-driving pulley 80 by an unillustrated driving means so as to rotate the belt-driving pulley 80 in the direction of arrow T during the drawing out of the paper and in the direction of arrow T' at the start of the heat sensitizing operation. The transport belt 92 rotates in the directions of arrows S and S' in correspondence with the rotation of the belt-driving pulley 80 in the directions of arrows T and T', respectively.

A portion of the transport belt 92 located between the belt-driving pulley 80 and the roller 84 forms the paper passage at the time of such as the drawing-out of the paper in cooperation with the bottom plate 87, and two feed rollers 88 are disposed in this paper passage in such a manner as to abut against the transport belt 92. The thermosensitive paper which is introduced onto the bottom plate 87 is nipped by the transport belt 92 and the feed rollers 88, and moves in conjunction with the rotation of the transport belt.

Further, two feed rollers 86 are disposed in such a manner as to abut against a portion of the transport belt 92 located between the platen roller 82 and the belt-driving pulley 80. The thermosensitive paper which is in the process of being heat-sensitized moves in the direction of arrow U or U' while being nipped by the feed rollers 86 and the transport belt 92, which rotates in the direction of arrow S or S'.

An accommodating section 109 for accommodating a portion of the thermosensitive paper, which is in the process of being heat-sensitized, is disposed at an extension of the transport belt 92 in the direction of arrow U. A pair of drive rollers 106 for pulling the thermosensitive paper into the accommodating section 109 or discharging it therefrom are disposed in the vicinity of an inlet portion of the accommodating section 109.

It should be noted that the bottom plate 87 in the vicinity of the belt-driving pulley 80 is formed in a shape which depicts an arc along the shape of the belt-driving pulley 80. A discharge passage 107, constituting a passage for discharging the thermosensitive paper on which an image has been recorded, is disposed above an extension of a terminating end of the arcuate portion of the bottom plate 87. A pair of discharge rollers 108, which are driven by an unillustrated driving means, are disposed at a terminating end of this discharge passage. These discharge rollers 108 are adapted to pull in the thermosensitive paper in the discharge passage 107, and discharge the same onto a discharge tray 100 provided in an upper portion of the color printer 12.

A support arm 76 is disposed below the discharge tray 100, and a thermal print head 78, which is comprised of unillustrated heating elements and the like arrayed in a main scanning direction (in an image recording direction perpendicular to the plane of the drawing), is provided at a distal end portion of the support arm 76.

In addition, a supply roll 74 for supplying an elongated ink sheet 110, on which thermal copying ink of the various colors has been coated, is disposed below the support arm 76. As shown in FIG. 5B, thermal copying ink C, M, Y, and K is consecutively and repeatedly coated in that order in regions of the ink sheet 110, which are substantially of the same shape and size as those of the recordable image of the thermosensitive paper.

Further, a collecting roll 96 for collecting the ink sheet 110 is disposed below an end portion of the underside of the discharge tray 100 opposite to the side where the supply roll 74 is disposed. When the collecting roll 96 rotated in the direction of arrow V by an unillustrated driving means, the ink sheet wound around the supply roll 74 is consecutively taken up onto the collecting roll 96. Incidentally, feed rollers 94 for disposing the sheet in a desirable position are arranged in of the passage for collecting the ink sheet 110.

In addition, the ink sheet 110 is nipped by the thermal print head 78 and the transport belt 92 is stretched by the platen roller 82, and the thermosensitive paper is transported into a nip between the nipped portion of the ink sheet 110 and the transport belt 92. Namely, the ink sheet 110 is disposed in between the thermal print head 78 and the thermosensitive paper.

During the recording of an image, the heating elements of the thermal print head 78 convert electric signals, corresponding to the image data transmitted from an unillustrated control unit, into thermal signals, and the thermosensitive paper is concurrently transported in the direction of arrow U. Chemical reaction takes place between the ink coated on the ink sheet 110 and heat-sensitive materials coated on the thermosensitive paper in correspondence with the thermal signals from the thermal print head 78, thereby recording an image corresponding to the image data on the thermosensitive paper.

It should be noted that an air-cooling window 114 for fetching air-cooling air from the outside is provided at the back of the housing 72 of the color printer 12, and an air-cooling section 112 having an apparatus-cooling fan incorporated therein is installed on the rear side of the air-cooling window 114.

Figure 5B:
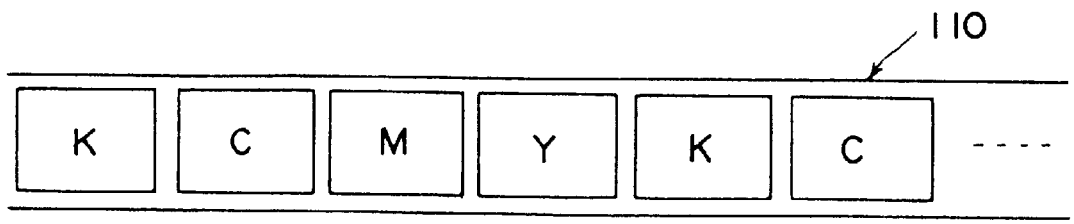

FIG. 5A shows a perspective view of a system for supplying and collecting the ink sheet 110 and a thermosensitive-paper transporting system.

FIG. 5A shows the manner in which as the belt-driving pulley 80 is rotated in the direction of arrow T, thermosensitive paper 116 is transported in the direction of arrow U, and an image is formed by heat transfer onto the ink sheet 110 and the thermosensitive paper 116 by the thermal print head 78. In addition, because the image data are respectively supplied separately as the dot percent data C, M, Y, and K, one of the ink regions C, M, Y, and K of the ink sheet 110 is constantly set in proper position (in the example illustrated in FIG. 5A, the K region is set) as the collecting roll 96 is rotated in the direction of arrow V, such that one of the ink C, M, Y, and K shown in FIG. 5B will be heat-transferred onto the thermosensitive paper 116 in correspondence with the dot percent data of the corresponding color.

To heat-transfer the ink of all the four colors, C, M, Y, and K, onto one sheet of thermosensitive paper 116, a total of four image recordings are required. That is, after completion of the heat transfer of one color, the thermosensitive paper 116 is returned to the position for starting the image recording, and after the ink sheet 110 is reset so that an ensuing color can be transferred, image recording is effected with respect to the ensuing color. This process is repeated until the image recording is completed for the last color. For this reason, the color printer 12 adopts a transport system which is called a switchback system. Referring now to FIGS. 6A to 6E, a description will be given hereafter of the transport passages for the thermosensitive paper based on this transport system. Incidentally, the transport passages for the thermosensitive paper are indicated by thick lines in the respective drawings.

As shown in FIG. 6A, the thermosensitive paper which is set in the paper tray 98 is first drawn out by the rotation of the drawing-out roller 101, is transported along the paper passages 103 and 105 by the rotation of the transport rollers 102 and 104, and reaches the guide lever 90 while traveling in a semicircle. Since the guide lever 90 is set to the position 90a at this time, the thermosensitive paper which has exited from the paper passage 105 is inserted into the passage between the bottom plate 87 and the transport belt 92, and advances along the bottom plate 87 in the direction of arrow I by means of the transport belt 92, which rotates in the direction of arrow S.

When the thermosensitive paper, which has advanced in the direction of arrow I, reaches the arcuate portion at the terminating portion of the bottom plate 87, the thermosensitive paper rises along the arc and is inserted into the discharge passage 107 located thereabove, with its leading end stops at a position immediately before the discharge rollers 108, as shown in FIG. 6B. At this time, the guide lever 90 is changed over from the position 90a to the position 90b, and the transport belt 92 is rotated in the opposite direction, i.e., in the direction of arrow S'.

The thermosensitive paper, which is set in the position shown in FIG. 6B, advances in the direction of arrow I' opposite to the direction at the time of drawing out, along the transport belt 92 rotating in the direction of arrow S', and rises along the guide lever 90 changed over to the position 90b. When the leading end of the thermosensitive paper is inserted into the nip between the thermal print head 78 and the platen roller 82, thermal recording is started. Incidentally, at the start of recording, the ink sheet 110 is positioned in such a way that one of the ink regions (e.g., the C region) of the ink sheet 110 coincides with the recording region of the thermosensitive paper.

As shown in FIG. 6C, the thermosensitive paper undergoing thermal recording advances in the direction of arrow J, and the ink sheet 110 is also supplied from the supply roller 74 in conjunction with the advance of the thermosensitive paper. At this time, image data signals (C, M, Y, or K) are transmitted from the unillustrated control unit to the thermal print head 78, and the thermal print head 78 converts the image data signals into thermal signals corresponding to the image. As a result of the thermal signals, reaction takes place between the ink coated on the ink sheet 110 and the materials coated on the thermosensitive paper, and an image corresponding to the relevant color is recorded on the thermosensitive paper as the thermosensitive paper advances in the direction of arrow J. A leading end portion of the thermosensitive paper, which has advanced in the direction of arrow J, is drawn into the accommodating section 109 by the drive rollers 106, as shown in FIG. 6C.

When the image in the relevant color is recorded for all the image region of the thermosensitive paper, the transport belt 92 rotates in the direction of arrow S, with the result that the thermosensitive paper passes through the opposite path from the position indicated by the thick line in FIG. 6C, and is returned to the position prior to thermal recording indicated by the dotted line. Here, the position of the ink sheet 110 is reset so that the ink region of the color to be recorded next will coincide with the recording region of the thermosensitive paper. Then, the transport belt 92 rotates again in the direction of arrow S', and the thermal print head 78 converts the image data on the next color into thermal signals, thereby recording an image in that color on the thermosensitive paper. In this way, one thermal recording is effected with respect to each of the ink regions C, M, Y, and K of the ink sheet 110, i.e., a total of four thermal recordings are repeatedly effected (switchback system).

When the image is recorded for all the image data C, M, Y, and K, the transport belt 92 rotates in the direction of arrow S at the position prior to the image recording indicated by the dotted line in FIG. 6C, so that the thermosensitive paper is transported and rises along the discharge passage 107. Then, as shown in FIG. 6D, when its leading end portion reaches the discharge rollers 108, the thermosensitive paper is discharged onto the discharge tray 100 by the rotation of the discharge rollers 108.

As shown in FIG. 6E, upon completion of the discharging of the image-recorded thermosensitive paper onto the discharge tray 100, the guide lever 90 is changed over from the position 90b to the position 90a.

Next, referring to the flowchart shown in FIG. 7, a description will be given of the procedure for adjusting the calibration of the color printer 12 in the system shown in FIG. 1.

Figure 7:
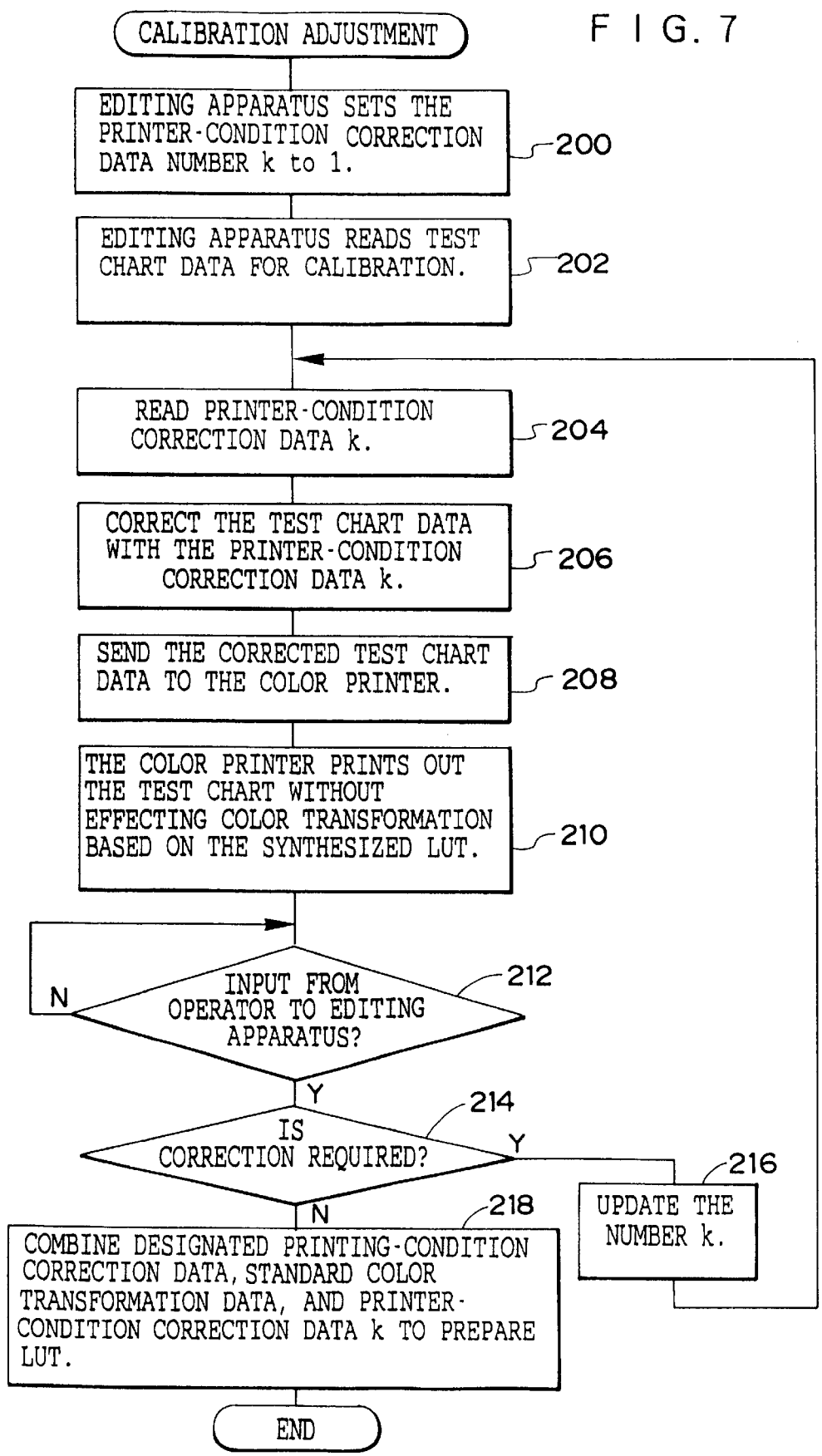
FIG. 7 is a flowchart illustrating the flow of calibration adjustment for the color printer in accordance with an embodiment of the present invention.

As shown in FIG. 7, the editing apparatus 10 first sets a printer-condition correction data number k to 1 (Step 200). This printer-condition correction data number k refers to a number (data 1, 2, 3, . . . , N) which is imparted consecutively to the plurality of pieces of printer-condition correction data stored in the data memory 42 of the editing apparatus 10, and each of the numbers matches the corresponding number of the printer-condition correction data 70 of the color printer 12. Incidentally, in cases where, for example, optimum correction data of the printer conditions or correction data in the neighborhood thereof are known in advance, initialization may be carried out at the number of that correction data, and the number k may not necessarily be set to 1.

Next, the CPU 30 of the editing apparatus 10 reads test chart data for calibration in the RAM 34 (Step 202). This test chart data is data that can be used as a test chart such as the one shown in FIG. 13 during printing, and is comprised of K, C, M, and Y data for each density. In the test chart shown in FIG. 13, data for the respective colors K, C, M, and Y are respectively printed out in square regions in 5% steps ranging from 0% to 100% in terms of the dot percentage (%). Incidentally, this test chart data can be obtained if a print for a test chart prepared in advance is read by the color scanner 50 and the scanned data is inputted to the editing apparatus 10. The test chart data may, of course, be stored in advance in the data memory 42.

Next, as shown in FIG. 7, the CPU 30 reads the printer-condition correction data k in the RAM 34 (Step 204). Here, since k has been set to 1 in Step 200, the printer-condition correction data 1 is read. This printer-condition correction data is the one stored in the data memory 42, but the printer-condition correction data 70 of the color printer 12 may be read.

Next, the, test chart data which has been read in Step 202 is corrected by using the printer-condition correction data k which has been read in Step 204 (Step 206). Through this correction, the Y, M, C, K data of the test chart data prior to correction are corrected as $TY=Py\ (Y)$ $TM=Pm\ (M)$ $TC=Pc\ (C)$ $TK=Pk\ (K)$ The number of pieces of test chart data shown in FIG. 13 is only 21 I 4=84, so that correction can be made in a very short time.

Then, the corrected test chart data is transmitted to the color printer 12 via the input/output interface circuit 40 (Step 208). Here, an instruction to the effect that the data being sent is a test chart is written in the header portion of the test chart data to be transmitted, so that the color printer 12 can discriminate the instruction from ordinary image data.

Next, the color printer 12 prints out the test chart data inputted thereto without effecting color transformation using the synthesized LUT 60 (Step 210). Namely, the data changeover unit 52 shown in FIG. 3 determines that the input data is the test chart data TY, TM, TC, and TK, and transmits the input data directly to the data output unit 62 via the second output path 47. Incidentally, the data output unit 62 effects image recording for each color on the basis of the switchback system shown in FIGS. 6A to 6E, and outputs the test chart shown in FIG. 13.

Next, a determination is made as to whether or not an input from the operator to the editing apparatus 10 has been made (Step 212). If there has been no input (NO is the answer in the determination in Step 212), the operation waits without effecting the next processing. Here, the operator visually compares the printed test chart and reference data which is of the same format as that shown in FIG. 13 and which has been printed in advance to standard gradations. Then, the operator instructs next processing on the basis of the result of comparison by using the keyboard or mouse 36 of the editing apparatus 10.

When there has been an input from the operator (YES is the answer in the determination in Step 212), the editing apparatus 10 analyzes the input, and makes a determination as to whether or not the correction of the printer conditions has been requested (Step 214).

If it is determined that a request for correction has been made (YES is the answer in the determination in Step 214), i.e., if there is a difference of a fixed level or more in the output density between the test chart and the reference data, the printer-condition correction data number k is updated (Step 216). In this updating, instead of simply incrementing the number, an arrangement may be provided such that the correction data to be tested next is selected depending on the extent to which the output density between the test chart and the reference data differs. Then, the operation returns to Step 204 to effect similar processing with respect to the printer-condition correction data of the update number k.

Meanwhile, if it is determined in Step 214 that a request for correction has not been made, i.e., if there is no difference of a fixed level or more in the output density between the test chart and the reference data, the synthesized LUT 60 is prepared so that the already-designated printer-condition correction data concerning the color-printing machine 20, the standard color transformation data, and the printer-condition correction data k determined in the above processing are combined by the synthesizing calculation unit 64 (Step 218). This completes the calibration adjustment.

Thus, in the calibration adjusting method in accordance with this embodiment, each time the printer-condition correction data is updated, the synthesized LUT 60 of a large capacity is not prepared in the conventional manner, but appropriate printer-condition correction data is determined on the basis of the test chart obtained by correcting the data of a very small capacity with only the printer-condition correction data, and the synthesized LUT 60 is finally prepared. As a result, it is possible to effect the calibration adjustment in a very short time.

Upon completion of the calibration adjustment, a color printing proof image is then prepared, color proofing is performed, and color printed matter is prepared by the color printing machine. Referring to the flowchart shown in FIG. 8, a description will be given of the flow of this processing.

Figure 8:
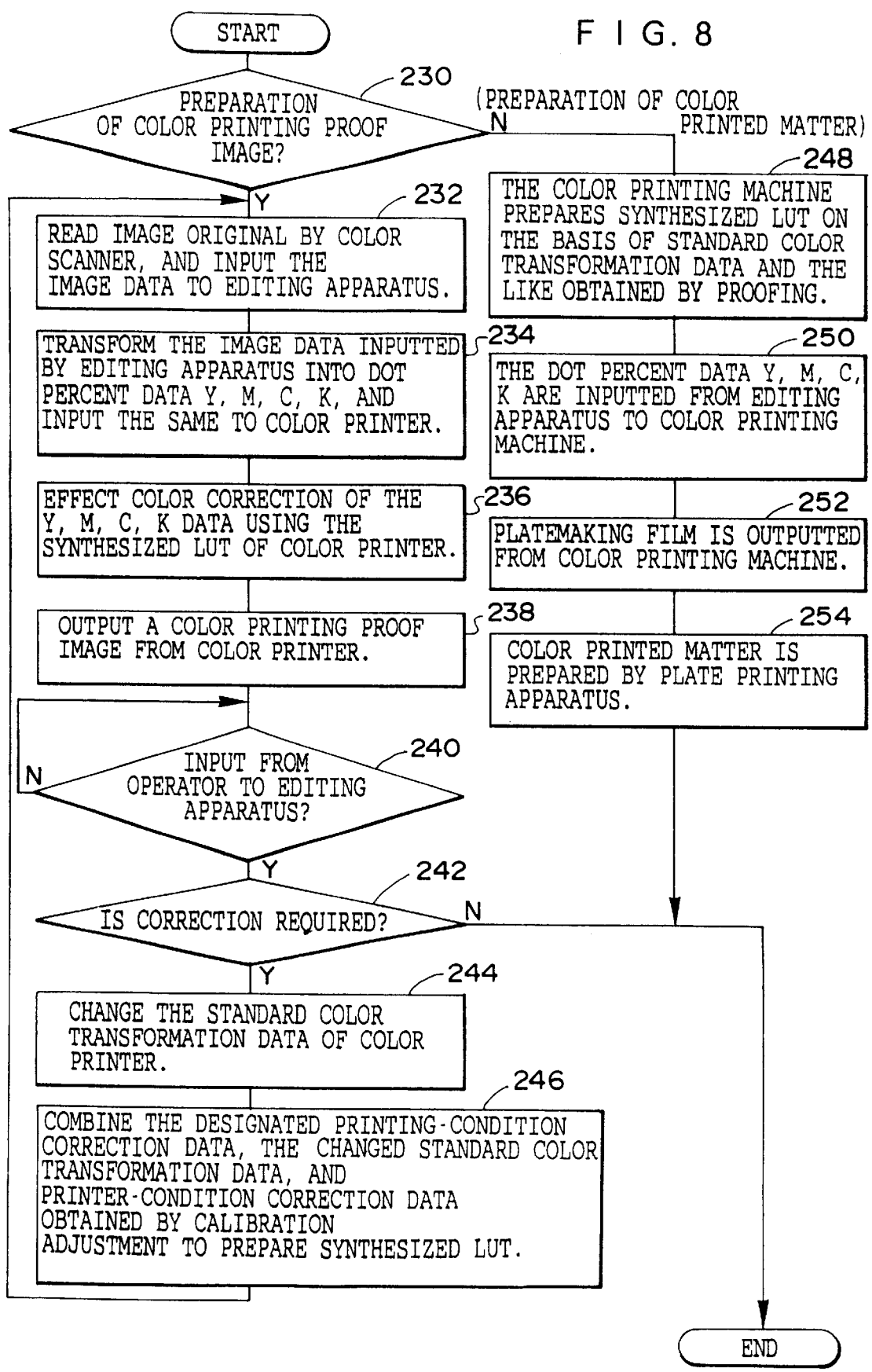
FIG. 8 is a flowchart illustrating the flow of color proofing processing for preparing a color printing proof image and processing for preparation of color printed matter using a color printing machine.

As shown in FIG. 8, if a color printing proof image is to be prepared (Step 230), the color scanner 50 reads the image original for a color printing proof image, and inputs the image data R, G, and B to the editing apparatus 10 (Step 232).

Next, the image data R, G, and B are transformed into the dot percent data Y, M, C, and K by the editing apparatus 10, and are inputted to the color printer 12 (Step 234).

In the color printer 12, the data changeover unit 52 determines that the image data is that for the color printing proof image, and transmits the input data to the color-correction calculating unit 58 via the first output path 45. On the basis of the synthesized LUT 60 prepared in the calibration adjustment shown in FIG. 7, the color-correction calculating unit 58 effects color correction by taking into consideration the printing conditions, color correction for proofing, and the printer conditions (Step 236). Incidentally, the color-correction calculating unit 58 performs interpolation calculation, as necessary (see FIG. 3).

Then, the data output unit 62 of the color printer 12 outputs the color printing proof image data subjected to color correction in Step 236 (Step 238). It should be noted that, in the data output unit 62, image recording is effected on the thermosensitive paper for each color by the switchback system, as shown in FIGS. 6A to 6E, and a color printing proof image of the image original is outputted.

Next, a determination is made as to whether or not an input from the operator to the editing apparatus 10 has been made (Step 240), and if there has been no input (NO in the determination in Step 240), the operation waits without effecting the next processing. Here, the operator determines whether or not the color printing proof image has been outputted with an appropriate color density, and controls the subsequent processing based on the result of determination by using the keyboard or mouse 36 of the editing apparatus 10.

It should be noted that, in the aforementioned determination, the color printing proof image is transferred from the thermosensitive paper onto plain paper used in actual color printing, and the operator determines the output density on the basis of the image transferred onto the plain paper. In the transfer onto the plain paper, a process is adopted in which, by using the thermosensitive paper 116 shown in FIG. 5 and also serving as laminated paper, four-color reversal images are prepared by consecutively printing K, C, M, Y reversal images thereon, and the four-color reversal images are heat-transferred onto plain paper.

In addition, it is also possible to adopt a method in which images of the respective colors, K, C, M, and Y, are respectively printed on sheets of transparent film, four-color reversal images are prepared by transferring the four-color images on the transparent films onto the respective sheets of laminated paper, and these four-color reversal images are heat-transferred onto plain paper. The reason that the color printing proof image is transferred onto the plain paper used in actual printing is to ensure fairness in color proofing, because heat-sensitive materials are coated on the thermosensitive paper, and also because there are glossy paper and matte paper among the types of the plain paper, so that the operator's visual impressions differ.

If there has been an input from the operator (YES in the determination in Step 240), the editing apparatus 10 analyzes the input, and determines whether or not proofing has been requested (Step 242).

If it is determined that color proofing has been requested (YES in the determination in Step 242), the standard color transformation data 68 of the color printer 12 is changed (Step 244). Then, a new synthesized LUT 60 is prepared by combining the already-designated printer-condition correction data, the changed standard color transformation data, and the printer-condition correction data obtained in the calibration adjustment shown in FIG. 7 (Step 246), and then the operation returns to Step 232 to repeat similar processing. The change and resynthesis of the correction data are effected by the operator by operating the keyboard or mouse 36 of the editing apparatus 10. On the other hand, if it is determined that color proofing has not been requested (NO in the determination in Step 242), the processing ends.

If color printed matter is to be prepared (NO in the determination in Step 230), the color printing machine 20 (see FIG. 1) prepares the synthesized LUT by combining the already-designated printer-condition correction data, the standard color transformation data obtained by proofing, and the printer-condition correction data obtained in the calibration adjustment (Step 248). Specifically as for this synthesized LUT, the synthesized LUT in the color printer 12, which has been finally prepared by proofing, may be transferred to the color printing machine 20 via the editing apparatus 10.

Next, the dot percentage data Y, M, C, and K on the color printed matter 26 is inputted to the color printing machine 20 from the editing apparatus 10. Incidentally, this data is one which has been obtained from the color scanner 50.

In the color printing machine 20, the inputted dot percentage data is subjected to color correction by the synthesized LUT obtained in Step 248, and this image is outputted to the platemaking film (Step 252).

Then, color printed matter to be finally obtained is prepared by subjecting this platemaking film to plate printing by a plate printing apparatus (Step 254), and the processing ends.

Thus, since color proofing is performed after effecting the calibration adjustment by using a highly versatile compact thermal printer, it is possible to enhance the efficiency in color proofing.

Second Embodiment

Next, referring to the block diagram shown in FIG. 9, a description will be given of a second embodiment of the present invention. It should be noted that those constituent parts and features that are similar to those of the first embodiment will be denoted by the same reference numerals, and a description thereof will be omitted.

Figure 9:
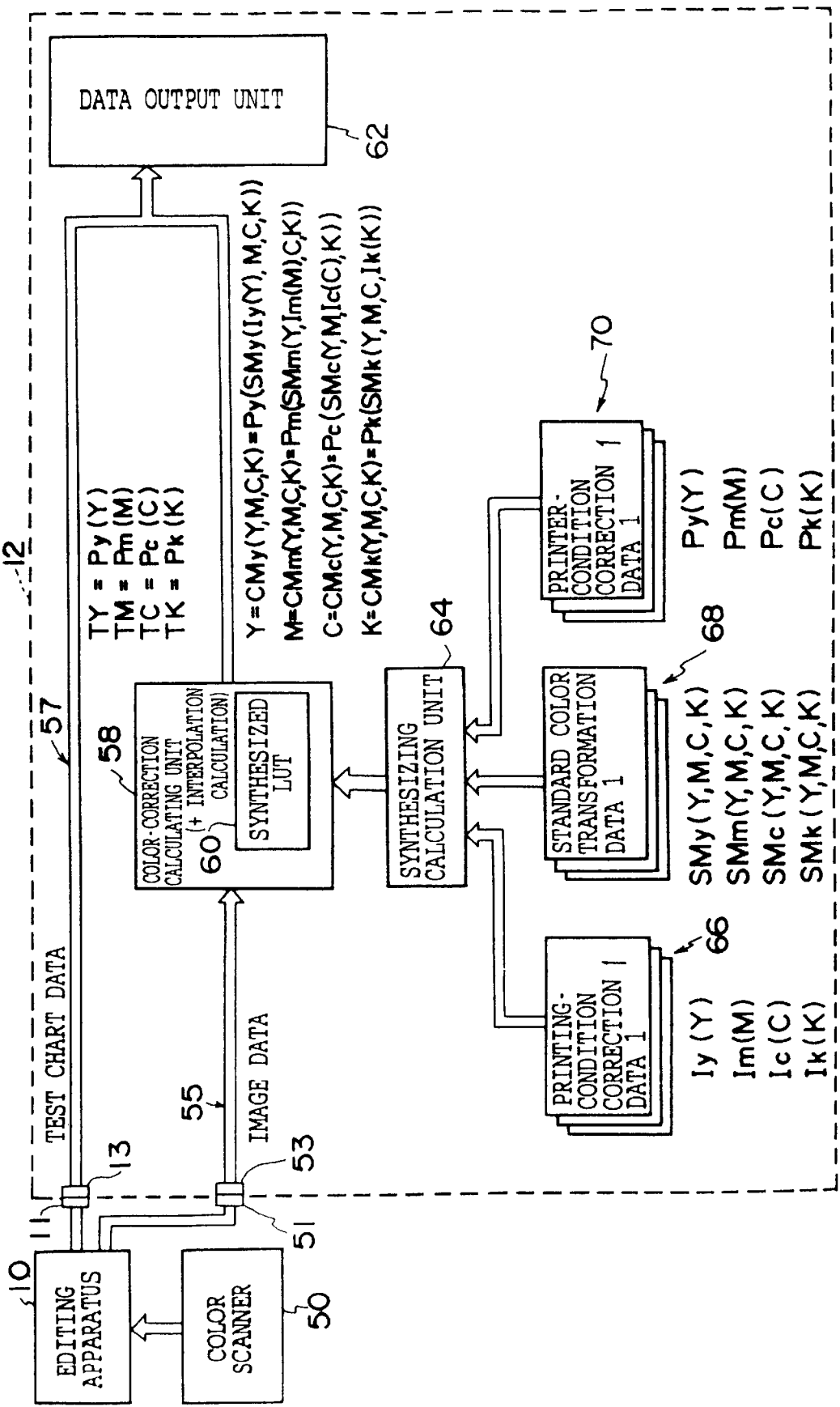
FIG. 9 is a block diagram of a color printer in accordance with a second embodiment.

As shown in FIG. 9, the color printer 12 in accordance with the second embodiment is not provided with the data changeover unit provided in the first embodiment, and is provided with an input terminal 53 of a first output path 55 and an input terminal of a second output path 57. Meanwhile, the editing apparatus 10 is provided with an output terminal 11 for outputting test chart data and an output terminal 51 for outputting image data for a color printing proof image. The output terminal 11 is connected to the input terminal 13, and the output terminal 51 to the input terminal 53.

As connection is thus provided, the image data for the color printing proof image outputted by the editing apparatus 10 is transmitted through the first output path 55, is subjected to color correction by the color-correction calculating unit 58, and is then outputted directly from the data output unit 62. Meanwhile, the test chart data outputted by the editing apparatus 10 is transmitted through the second output path 57, and is outputted directly from the data output unit 62 without being subjected to color correction by the color-correction calculating unit 58. Incidentally, even in a case where only one output terminal is provided for the editing apparatus 10, an arrangement may be provided such that the operator connects the output terminal to either the input terminal 11 or the input terminal 53 depending on the data to be outputted.

Since the flows of the calibration processing, the processing for preparing a color-printed image, and the like are similar to those of the first embodiment, a description thereof will be omitted.

In the second embodiment, as a changeover between the first output path and the second output path is effected through a changeover of connection of the color printer to an external apparatus, it becomes unnecessary to provide the color printer with a changeover means for changing over the output path, so that the apparatus can be made compact and simple.

As described above, in accordance with the embodiments of the present invention, since color correction is effected by using one synthesized LUT 60, color correction calculation can be effected at high speed with a simple configuration. In particular, in a case where color correction based on the synthesized LUT 60 is effected by software, high-speed calculation becomes possible, while in a case where the color correction is effected by hardware, since the configuration is simple, an inexpensive and compact apparatus can be realized. Moreover, since correction of the printer conditions and printing conditions has been taken into consideration in the synthesized LUT 60, it becomes possible to prepare a color printing proof image with high accuracy.

Although the method of adjusting the calibration of the color printer 12 in accordance with the embodiments of the present invention has been described above, the calibration adjustment method is not confined to the above-described examples. For example, although the synthesized LUT 60 for color correction is formed as a table, a neural network 130 shown in FIG. 10 may be used for color correction instead of the table.

Figure 10:
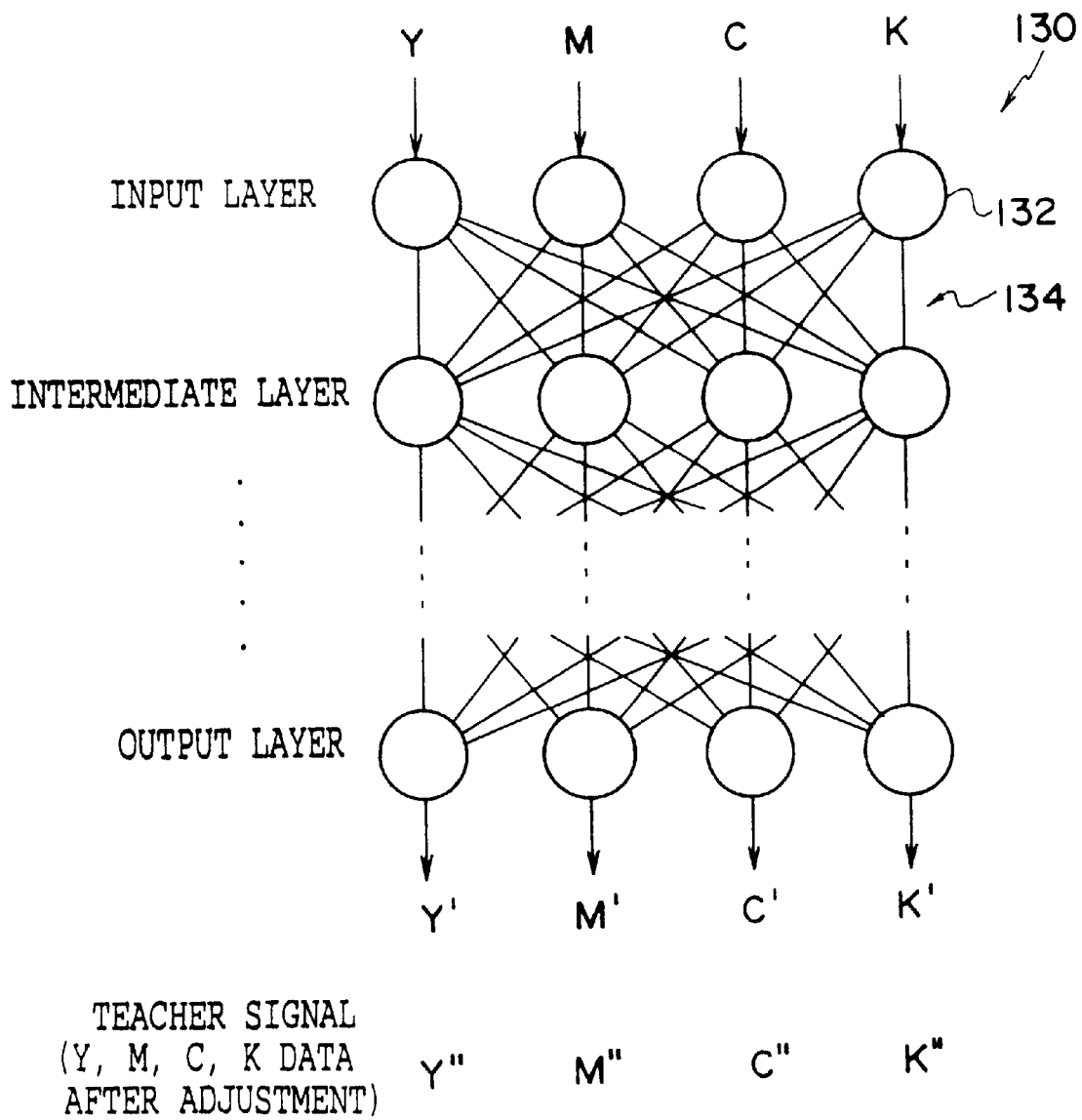
FIG. 10 is a schematic diagram of a neural network used instead of a synthesized LUT for color correction in the color printer in accordance with an embodiment of the present invention.
Figure 11:
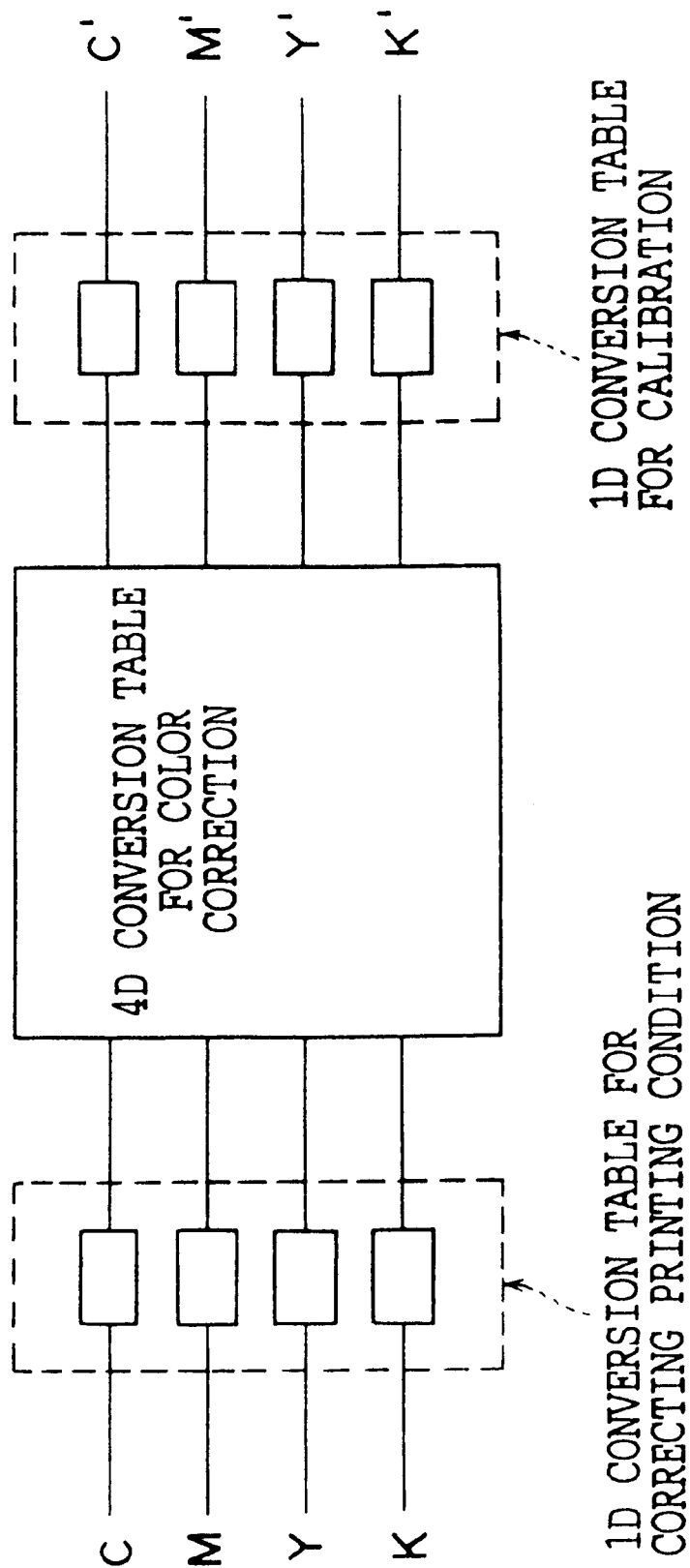
FIG. 11 is a diagram illustrating a color correction table in conventional calibration adjustment.

As shown in FIG. 10, this neural network 130 is comprised of three or more layers, including an input layer into which the data Y, M, C, and K are inputted, one or more intermediate layers, and an output layer for outputting color-corrected Y', M', C', and K' data, and neuron elements 132 in the respective layers are connected to each other by synaptic coupling 134. In a case where this neural network is used for color correction, e.g., Step 218 shown in FIG. 7 during the calibration adjustment, retraining is effected by the so-called back-propagation learning method by using as teacher signals the Y", M', C', and K" data adjusted in the early stage.

In addition, in the color printer 12, although color correction is effected with respect to the dot percent data Y, M, C, and K, the present invention is also applicable to cases where correction is effected with respect to the R, G, B data. In this case, the synthesized LUT 60 becomes a three-dimensional table.

In addition, although the synthesized LUT 60 is prepared by combining three kinds of correction data, including the printing-condition correction data, the standard color transformation data, and the printer-condition correction data, the present invention is also applicable to cases where correction data for correcting a machine difference of an input apparatus such as a color scanner is synthesized, or cases where a plurality of kinds of correction data, other than three kinds, are used.

It should be noted that the present invention, in which a synthesized LUT obtained by combining a plurality of kinds of correction data is used, is applicable to all the color correction apparatuses for effecting color correction into input/output color representation values that are peculiar to an input/output apparatus connected to a color-image input/output system, such as a color printing machine, a color copying machine, a color facsimile machine, and a color display, in addition to an apparatus for preparing a color printing proof image.

What is claimed is:

1. A color correction apparatus for effecting a plurality of kinds of color correction, comprising:

input means for inputting digital color image data;

color-correction calculating means for effecting the plurality of kinds of color correction of the digital color image data inputted to said input means, in one stage of synthesized color correction; and output means for outputting the digital color image data subjected to color correction by said color-correction calculating means;

wherein said kinds of color correction actually used for a given correction include color correction as standard color transformation, and color correction for correcting a difference in color output density due to at least one of a printer condition, comprising a condition related individually to one or more of different types of printers, a change in the printing environment or a change in printer characteristics over time on an output apparatus side, and a printing condition, comprising a condition related individually to the conditions of printing the image on a printing machine comprising at least one of the type of printing paper and printing environment for outputting a color print image on a color printing machine side, and wherein said standard color transformation comprises corrections independent of said conditions individually related to a printing machine side and an output apparatus side.

2. A color correction apparatus according to claim 1, wherein said color-correction calculating means effects a synthesized color correction on the basis of a single lookup table.

3. A color correction apparatus according to claim 1, further comprising:

storage means for storing for each kind of the color correction a plurality of pieces of data for color correction that serves as a basis of the color correction;

designating means for designating one piece of the data for color correction at a time for each kind of the color correction; and synthesizing means for preparing synthesized color-correction data that serves as a basis of synthesized color correction by combining the data for color correction designated by said designating means.

4. A color correction apparatus according to claim color 2, further comprising:

storage means for storing for each kind of the color correction a plurality of pieces of data for color correction that serves as a basis of the color correction;

designating means for designating one piece of the data for color correction at a time for each kind of the color correction; and synthesizing means for preparing synthesized color-correction data that serves as a basis of synthesized color correction by combining the data for color correction designated by said designating means.

5. A color correction apparatus according to claim 2, wherein said color-correction means performs interpolation calculation for intermediate data that are not prepared in the single look-up table.

6. A color correction apparatus according to claim 2, wherein transformations including affine transformation are performed in the single look-up table.

* * * * *